United States Patent [19]
Takahira

[11] Patent Number: 5,337,063
[45] Date of Patent: Aug. 9, 1994

[54] ANTENNA CIRCUIT FOR NON-CONTACT IC CARD AND METHOD OF MANUFACTURING THE SAME

[75] Inventor: Kenichi Takahira, Itami, Japan

[73] Assignee: Mitsubishi Denki Kabushiki Kaisha, Tokyo, Japan

[21] Appl. No.: 867,538

[22] Filed: Apr. 13, 1992

[30] Foreign Application Priority Data

Apr. 22, 1991 [JP] Japan .................................. 3-90323

[51] Int. Cl.⁵ .......................................... H01Q 11/12
[52] U.S. Cl. ..................................... 343/741; 343/745; 343/895
[58] Field of Search ............... 343/741, 742, 743, 744, 343/895, 866, 867, 868, 745; 29/600; H01Q 9/27, 4/36, 7/00

[56] References Cited

U.S. PATENT DOCUMENTS

| | | | |
|---|---|---|---|
| 3,956,751 | 5/1976 | Herman | 343/744 |
| 4,021,705 | 5/1977 | Lichtblau | 361/402 |
| 4,864,280 | 9/1989 | Meij | 343/895 |
| 4,922,261 | 5/1990 | O'Farrell | 343/742 |
| 4,947,180 | 8/1990 | Schotz | 343/743 |
| 4,947,180 | 8/1990 | Schotz | 343/744 |
| 5,108,822 | 4/1992 | Imaichi et al. | 343/895 |
| 5,128,686 | 7/1992 | Tan et al. | 343/744 |

FOREIGN PATENT DOCUMENTS

| | | |
|---|---|---|
| 3824870 | 4/1989 | Fed. Rep. of Germany . |
| 3590698 | 9/1989 | Fed. Rep. of Germany . |
| 2190819 | 11/1987 | United Kingdom . |
| 2191368 | 12/1987 | United Kingdom . |

Primary Examiner—Donald Hajec
Assistant Examiner—Tan Ho
Attorney, Agent, or Firm—Leydig, Voit & Mayer

[57] ABSTRACT

An antenna circuit for a non-contact IC card exchanges signals with an external device utilizing electromagnetic waves. The antenna circuit includes a coil and a capacitor connected to form a resonant circuit. The coil includes a main coil having a spiral conductive pattern disposed on a peripheral portion of a substrate and a plurality of adjusting patterns, each electrically connecting a portion of the conductive pattern corresponding to a desired number of turns of the main coil to an end of the main coil. The plurality of adjusting patterns are disconnected from the main coil, except for one adjusting pattern, to obtain a coil of desired inductance.

5 Claims, 6 Drawing Sheets

CONTROL SIGNAL
FROM CPU

ANTENNA CIRCUIT FOR NON-CONTACT IC CARD AND METHOD OF MANUFACTURING THE SAME

BACKGROUND OF THE INVENTION

Field of the Invention

The present invention relates to an antenna circuit for a non-contact IC card and a method of manufacturing such an antenna circuit.

Description of the Related Art

Non-contact IC cards exchanging signals via electromagnetic waves or light have been used in recent years. FIG. 5 shows the configuration of such a non-contact IC card. A ROM 2 and a RAM 3 are connected through a bus 8 to a CPU 1 for controlling the operation of the IC card. An input/output control circuit 4 for controlling input of data from and output of data to an external device (not shown) is connected to the bus 8. An antenna circuit 6 is Connected to the input/output control circuit 4 through a modem circuit 5. A battery 7 is incorporated for supplying power to the individual electric circuits.

In such an IC card, a command signal received by the antenna circuit 6 from an external device, such as a terminal machine, in the form of an electromagnetic wave is demodulated by the modem circuit 5 and then input to the CPU 1 through the input/output control circuit 4. The CPU 1 decodes the command signal and creates a predetermined response signal. This response signal is input to the modem circuit 5 through the input/output control circuit 4 which modulates this signal. The modulated signal is transmitted to an external device from the antenna circuit 6.

In a practical IC card, as shown in FIG. 6, the CPU 1, the ROM 2, the RAM 3, the input/output control circuit 4, the modem circuit 5 and the bus 8 are fabricated in a single IC 9, and this IC 9 and the battery 7 are mounted on a card substrate 10. The antenna circuit 6 for exchanging signals with an external device has a coil 62 having an inductance L and consisting of a conductive pattern 61 formed in a spiral on the peripheral portion of the card substrate 10, and a capacitor 63 having a capacitance C and fabricated on the card substrate 10. A combination of the coil 62 and the capacitor 63 forms an LC parallel resonant circuit as shown in FIG. 7, which induces a voltage when it receives an electromagnetic wave at a frequency close to the resonant frequency of the resonant circuit. The signal is received, by detecting that induced voltage. In that case, the frequency of the electromagnetic waves that can be received by the antenna circuit 6 is determined by the resonant frequency $fo = 1/\{2\pi(L \cdot C)^{\frac{1}{2}}\}$ of the LC parallel resonant circuit.

As stated above, the coil 62 of the antenna circuit 6 is formed on the peripheral portion of the card substrate 10 in the form of a conductive pattern. Therefore, the inductance L of the coil 62 is determined at the time of manufacture of the card substrate 10, and a change of the inductance L after the manufacture is impossible. Such an antenna circuit cannot be used when the frequency of a carrier used for exchanging signals is changed. Furthermore, matching of the resonant frequency cannot be conducted after the card substrate 10 is manufactured.

SUMMARY OF THE INVENTION

Accordingly, an object of the present invention is to provide an antenna circuit for a non-contact IC card for coping with a change of the carrier frequency and matching a resonant frequency after the circuit components are fabricated on a substrate.

Another object of the present invention is to provide a method of manufacturing such an antenna circuit for a non-contact IC card.

In order to achieve the above objects, according to one aspect of the present invention, there is provided an antenna circuit for an IC card comprising a coil and a capacitor connected to the coil to form a resonant circuit. The coil includes a main coil having a spiral conductive pattern disposed on a peripheral portion of a substrate, and a plurality of adjusting patterns each of which electrically connects a portion of the conductive pattern corresponding to a desired number of turns of the main coil to one end of the main coil. The plurality of adjusting patterns are disconnected from the main coil except for one adjusting pattern to obtain desired inductance characteristic.

According to another aspect of the present invention, there is provided an antenna circuit for a non-contact IC card comprising a coil having a conductive pattern disposed on a peripheral portion of a substrate, part of the conductive pattern being trimmed in a spiral fashion to obtain desired inductance characteristics, and a capacitor connected to the coil to form a resonant circuit.

According to another aspect of the present invention, there is provided an antenna circuit for a non-contact IC card comprising a coil having a spiral conductive pattern disposed on a peripheral portion of a substrate, a plurality of switches each of which is electrically connected between a portion of the conductive pattern corresponding to a desired number of turns of the coil at one end of the coil, and a capacitor connected to the other end of the coil to form a resonant circuit.

According to another aspect of the present invention, there is provided a method of manufacturing an antenna circuit for a non-contact IC card comprising forming a main coil having a spiral conductive pattern on a peripheral portion of a substrate, forming on the substrate a plurality of adjusting patterns each of which electrically connects a portion of the conductive pattern corresponding to a desired number of turns of the main coil to one end of the main coil, disconnecting the plurality of adjusting patterns from the main coil except for one adjusting pattern to obtain desired inductance characteristics, and connecting a capacitor to the other end of the main coil to form a resonant circuit.

According to another aspect of the present invention, there is provided a method of manufacturing an antenna circuit for a non-contact IC card comprising a conductive pattern on a peripheral portion of a substrate, forming a coil by trimming part of the conductive pattern in a spiral form while measuring the inductance of the conductive pattern until a desired inductance is obtained, and connecting one end of the coil to a capacitor to form a resonant circuit.

DESCRIPTION OF THE PREFERRED EMBODIMENTS

Embodiments of the present invention will be described below with reference to the accompanying drawings.

Figure 1:
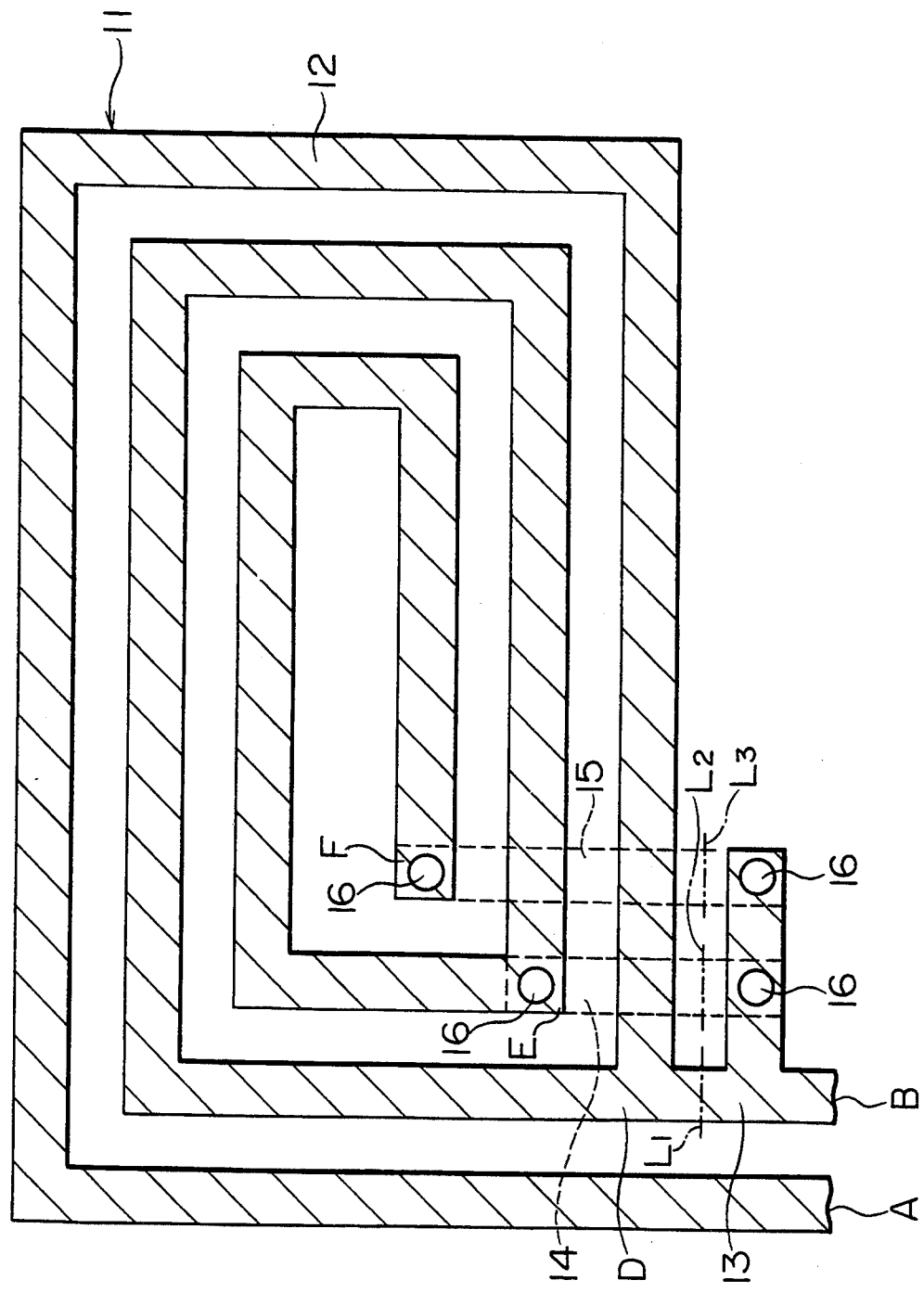
FIG. 1 is a schematic plan view of a coil of a first embodiment of an antenna circuit for a non-contact IC card according to the present invention.
Figure 6:
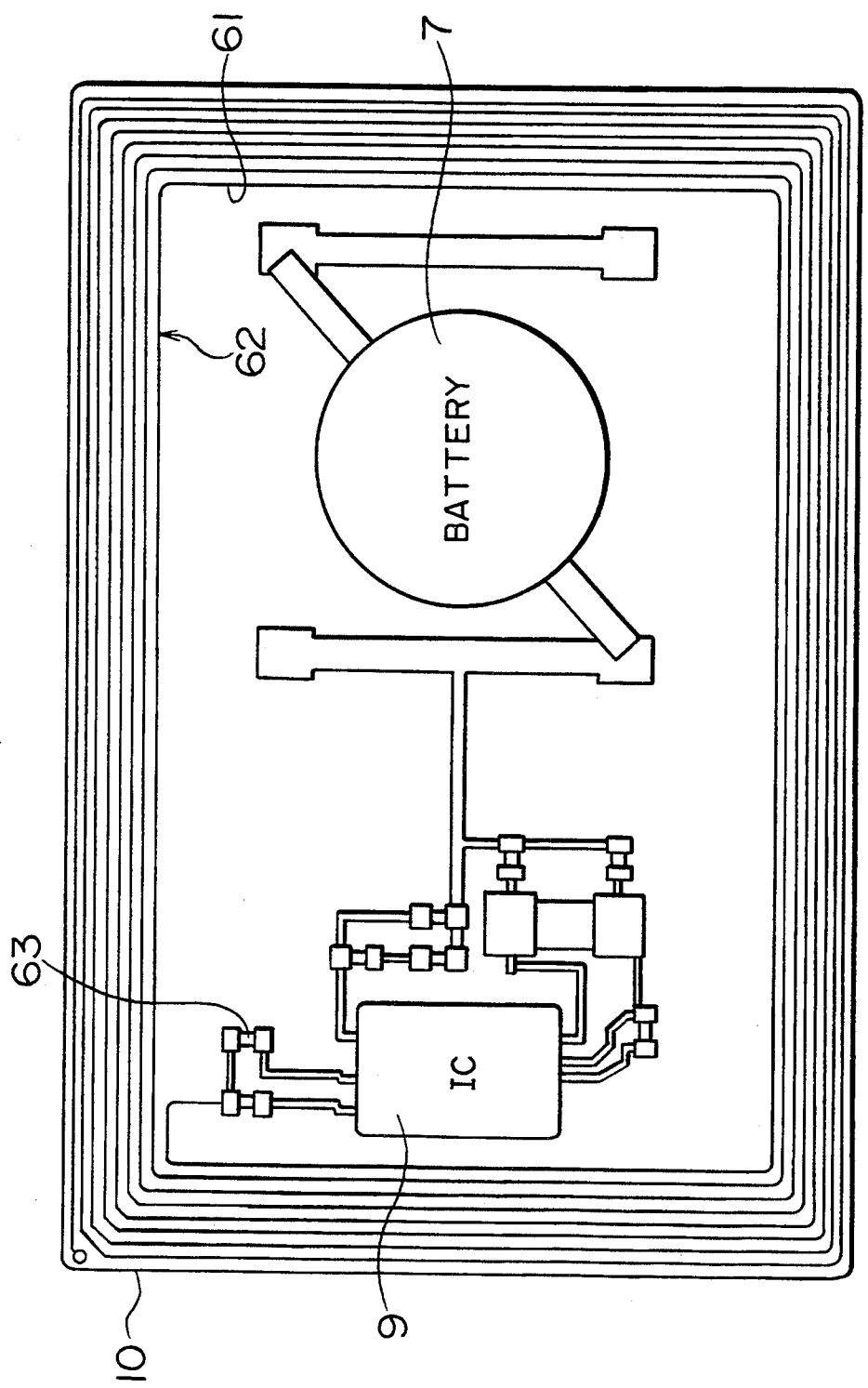
FIG. 6 is a plan view showing the mechanical structure of the non-contact IC card of FIG. 5.

FIG. 1 shows a coil 11 of a first embodiment of an antenna circuit for a non-contact IC card according to the present invention. FIG. 1 is a schematic view of the coil 11. Practically, the coil 11 is disposed on the peripheral portion of a card substrate, while an IC and other components, such as a battery, are located within the coil 11, as shown in FIG. 6. The coil 11 has a main coil 12 including of a conductive spiral pattern formed in three turns on the substrate. A first adjusting pattern 13 for connecting a portion D at which the first turn intersects the second turn, as viewed from an end portion A of the main coil 12, to the other end portion B of the main coil 12 is disposed on the substrate. A second adjusting pattern 14 for connecting a portion E at which the third turn terminates, as viewed from the end portion A of the main coil 12, to the other end portion B of the main coil 12 is disposed on the rear surface of the substrate. The second adjusting pattern 14 is electrically connected to the main coil 12 through via-holes 16. A third adjusting pattern 15 for connecting a portion F at which the third turn terminates, as viewed from the end portion A of the main coil 12, to the other end portion B of the main coil 12 is disposed on the rear surface of the substrate. This adjusting pattern 15 is electrically connected to the main coil 12 through via-holes 16.

The number of turns needed to form the coil 11 can be selected from among one to three by electrically disconnecting these three adjusting patterns 13 to 15 by cutting them at cutting lines L1, L2 or L3 except for one adjusting pattern. For example, if the adjusting pattern 13 is left connected while the other adjusting patterns 14 and 15 are disconnected, a coil 11 having a single turn is provided. Similarly, if the adjusting pattern 14 is left connected, a coil 11 having two turns is provided. Leaving the adjusting pattern 15 connected provides a coil 11 having three turns.

Generally, a relationship, expressed by $L = a \cdot N^2$, establishes the inductance L of the coil for the number of turns N of the coil, where a is a constant determined by the shape of a coil. Therefore, the inductance L of the coil 11 can be adjusted by changing the number of turns of the coil 11.

Figure 7:
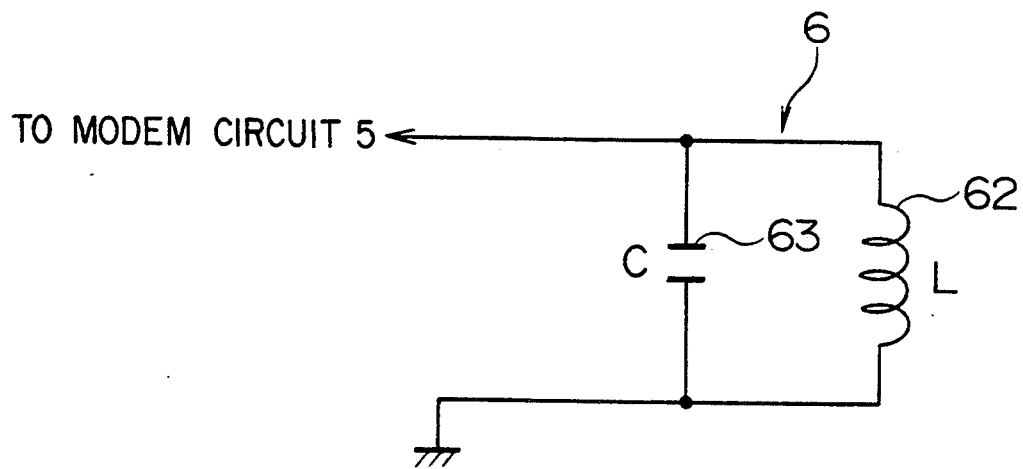
FIG. 7 is a circuit diagram of an antenna circuit for the non-contact IC card shown in FIG. 5.

A capacitor having a capacitance C is connected to the end portion A of the coil 11, as shown in FIGS. 6 and 7. This capacitor and the coil 11 in combination form an LC parallel resonant circuit which acts as an antenna circuit. In this antenna circuit, even after the circuit components are built on the substrate, a change of the carrier frequency can be coped with and matching of the resonant frequency can be achieved by making a selection among the adjusting patterns 13 to 15.

Such an antenna circuit will be manufactured in the following manner: First, the main coil 12 consisting of the spiral conductive pattern is formed on the peripheral portion of the substrate, and the adjusting patterns for respectively connecting the portions D to F of the main coil 12 to the end portion B are formed. Next, the adjusting patterns 13 to 15 are cut except for one of these patterns corresponding to a desired inductance. Cutting of the adjusting patterns is conducted by, for example, a laser beam, means of sand blasting or chemical etching. Thereafter, the capacitor is connected to the end portion A of the main coil 12 to form a resonant circuit. Connection of the capacitor to the end portion A of the main coil 12 may be made prior to the cutting of the adjusting patterns.

Although the main coil 12 having three turns is shown in FIG. 1, the number of turns of the coil is not so limited. In a practical circuit, a main coil having a several tens of turns is used. The number of adjusting patterns is not limited to three but four or more adjusting patterns may be formed.

Figure 2:
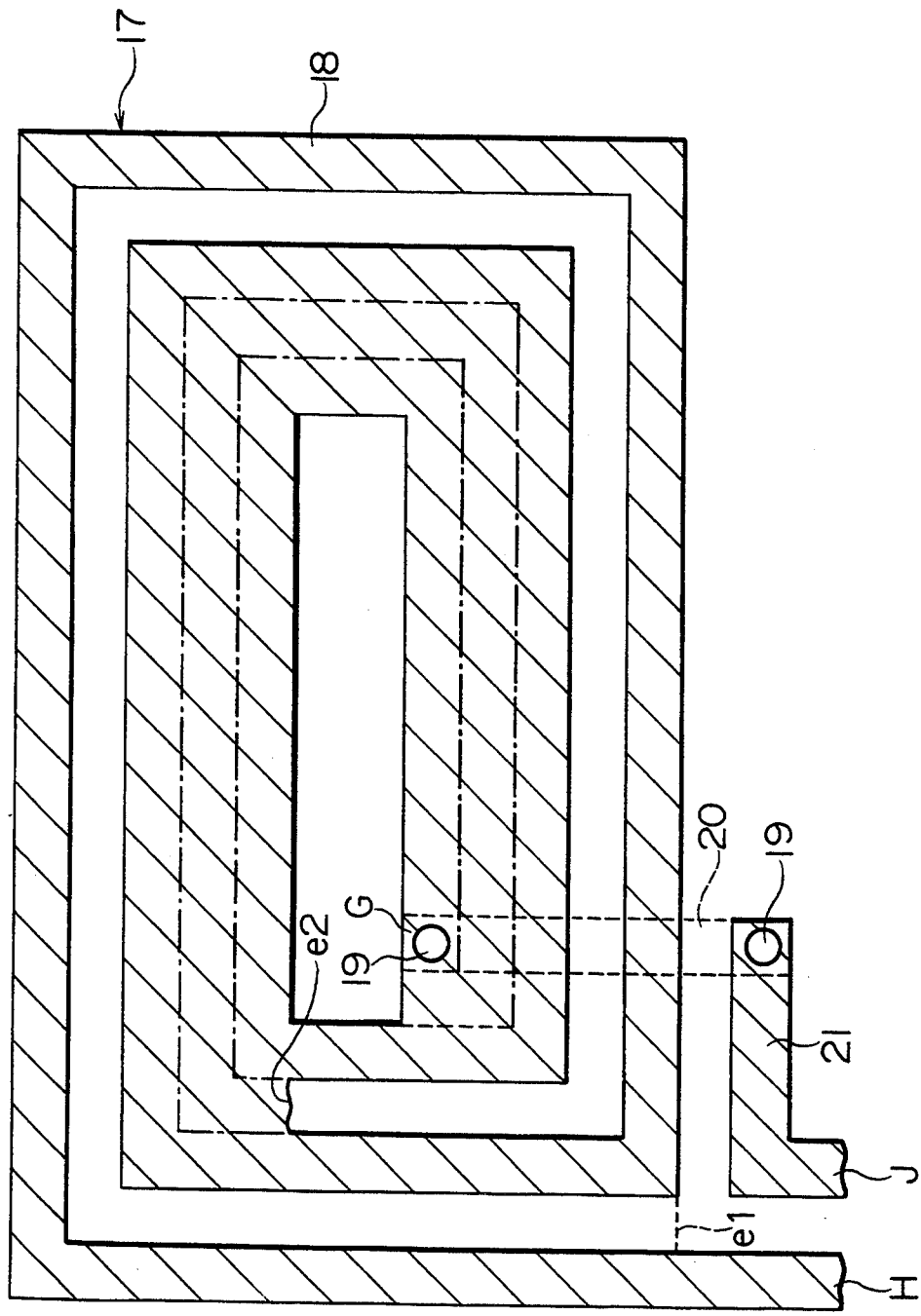
FIG. 2 is a schematic plan view of a coil of a second embodiment of the antenna circuit.

FIG. 2 shows a coil 17 according to a second embodiment of an antenna circuit according to the present invention. FIG. 2 is a schematic view of the coil 17. Practically, the coil 17 is disposed on the peripheral portion of a card substrate, while an IC and other components, such as a battery, are located within the coil 17, as shown in FIG. 6. The coil 17 has a conductive pattern 18 formed on the substrate and partially trimmed in a spiral form. The innermost portion G of the conductive pattern 18 is electrically connected to an end portion pattern 21 disposed on the surface of the substrate through via-holes 19 and a connection pattern 20 is disposed on the rear surface of the substrate. The conductive pattern 18 is trimmed in a spiral form from position e1 to position e2. The number of turns of the coil 17 can be changed and the inductance characteristics of the coil 17 can thus be adjusted by changing the trimming ending portion e2. In FIG. 2, a dashed line indicates a pattern line for further trimming A capacitor having a capacitance C is connected to an end portion H or J, as shown in FIGS. 6 and 7. This capacitor and the coil 17 in combination form an LC parallel resonant circuit which acts as an antenna circuit. In this embodiment, even after the circuit components are fabricated on the substrate, a change in the carrier frequency can be coped with and the resonant frequency can be matched by further trimming the conductive pattern 18.

Figure 3:
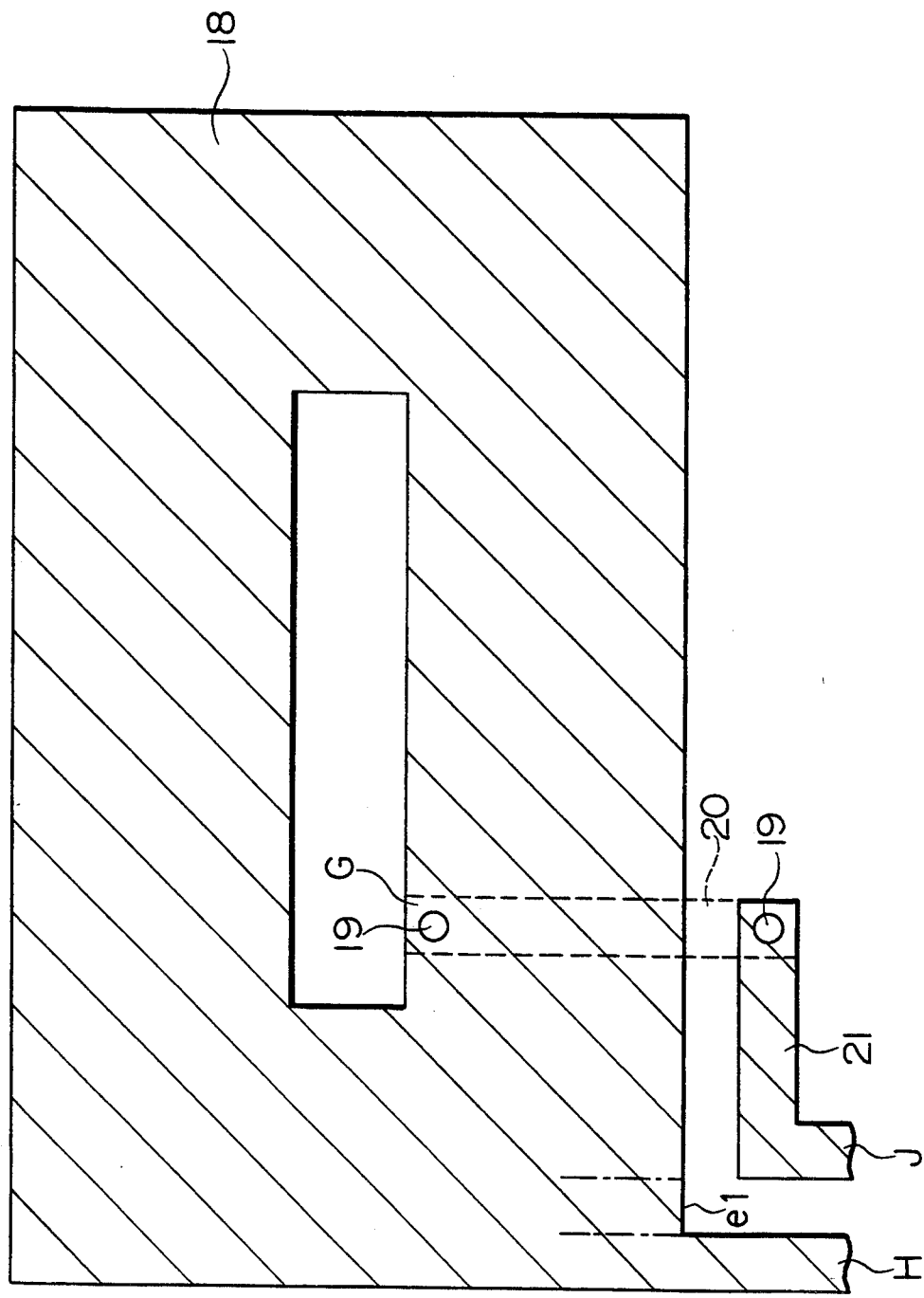
FIG. 3 is a schematic plan view of a conductive pattern formed at the initial stage of the manufacturing process of the antenna circuit shown in FIG. 2.

Such an antenna circuit will be manufactured in the manner described below. First, a wide ring-shaped conductive pattern 18 is formed on the peripheral portion of the substrate, as shown in FIG. 3, while the connection pattern 20 and the end portion pattern 21, connected to the portion G of the conductive pattern 18, are formed. Next, the conductive pattern 18 is trimmed in a spiral form starting from the position e1 while the inductance between the end portion H of the conductive pattern 18 and the end portion J of the end portion pattern 21 is measured using an inductance measuring device until a desired inductance value is obtained. Preferably, trimming is conducted such that the width of the conductive pattern which is not trimmed is constant. As trimming proceeds, the number of turns of the coil 17 as viewed from the end portions H and J gradually increases, thus increasing the inductance L of the coil 17. Trimming is ended when the desired inductance value has been obtained. Thereafter, the capacitor is connected to the end portion H of the conductive pattern 18 or to the end portion J to form a resonant circuit.

Connection of the capacitor may be conducted prior to trimming of the conductive pattern 18.

In this method of manufacturing the antenna circuit, since trimming of the conductive pattern 18 is conducted while measuring the inductance of the coil 17, the inductance can be adjusted with a very high degree of accuracy.

Figure 4:
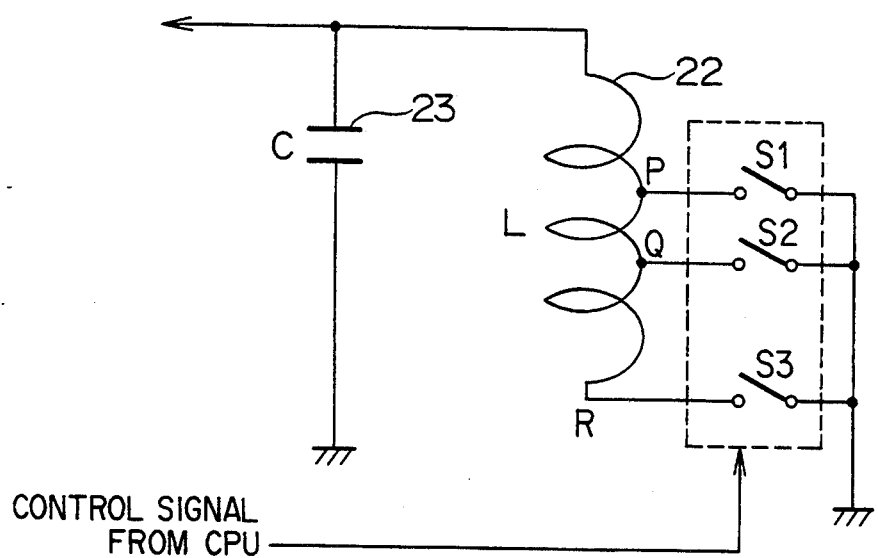
FIG. 4 is a circuit diagram showing the configuration of a third embodiment of the antenna circuit according to the present invention.
Figure 5:
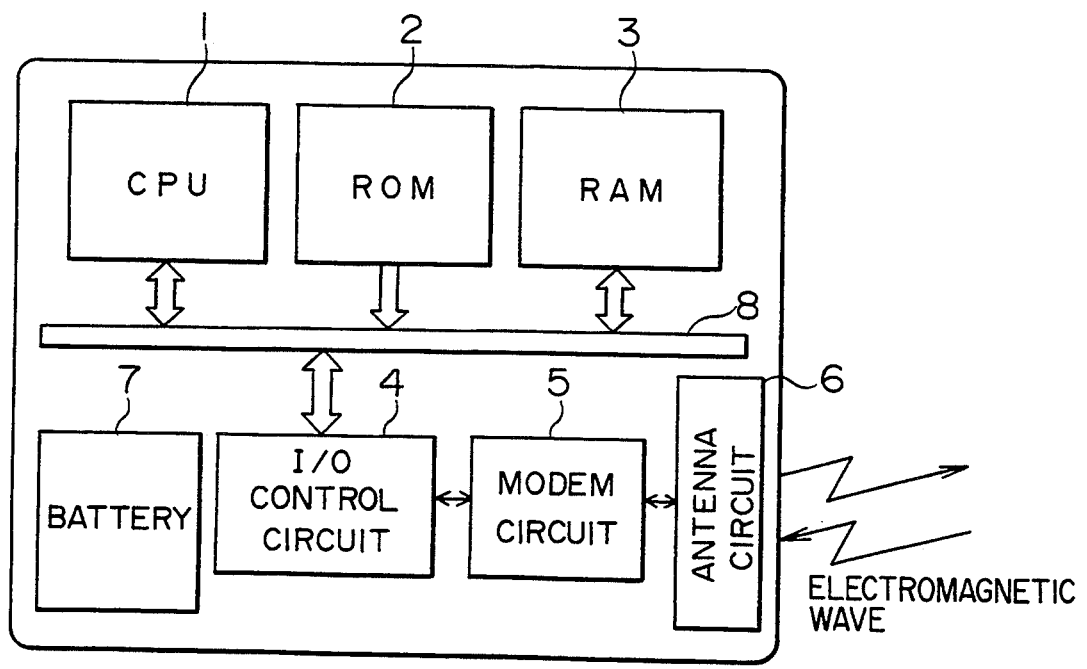
FIG. 5 is a block diagram of a conventional non-contact IC card.

FIG. 4 shows a third embodiment of the antenna circuit according to the present invention. One end of a coil 22 having an inductance L is connected to one end of a capacitor 23 having a capacitance C to form an LC resonant circuit. The coil 22 is in the form of a solenoid coil. Coil taps P, Q and R corresponding to predetermined numbers of turns are respectively connected to one end of switches S1, S2 and S3. The other ends of these switches S1, S2 and S3 are connected with each other and to ground, thereby forming the other end of the coil 22.

By turning on one of the switches S1, S2 and S3 while turning off the other switches, the number of turns of the coil 22 can be selected from among three values. That is, by changing the switch that is turned on, the number of turns of the coil 22 can be changed. Consequently, the inductance of the resonant circuit can be adjusted.

The third embodiment may be implemented by forming a coil including a spiral conductive pattern and a plurality of adjusting patterns on the peripheral portion of the substrate in a similar manner to that of the first embodiment shown in FIG. 1 and then by providing a switch for connecting and disconnecting the adjusting pattern on each adjusting pattern.

The switches S1, S2 and S3 may be semiconductor analog switches. Also, the number of switches is not limited to three.

In the third embodiment, the positions of the switches S1, S2 and S3 can be controlled by a control signal from a CPU (not shown) incorporated in the non-contact IC card. That is, the essential inductance of the coil 22 can be changed by a program which controls the CPU.

What is claimed is:

1. A method of manufacturing an antenna circuit of a non-contact IC card comprising:
   forming a main coil having first and second ends and a multiple turn spiral conductive pattern on a first surface of a substrate having opposed first and second surfaces;
   forming on the second surface of the substrate a plurality of adjusting patterns, each adjusting pattern electrically connecting a portion of the conductive pattern on the first surface corresponding to a respective number of turns of the main coil to the first end of the main coil;
   cutting and thereby electrically disconnecting said plurality of adjusting patterns from the main coil except for one adjusting pattern to obtain a desired main coil inductance; and
   connecting a capacitor to the second end of the main coil to form a resonant circuit.

2. A method of manufacturing an antenna circuit of a non-contact IC card comprising:
   forming a conductive pattern on a peripheral portion of a surface of a substrate;
   forming an at least partially spiral coil having an end from the conductive pattern and removing part of the conductive pattern along a spiral path while measuring the inductance of the conductive pattern;
   stopping removal of part of the conductive pattern when a desired inductance is obtained; and
   connecting the end of the coil to a capacitor to form a resonant circuit.

3. An inductor for forming an antenna circuit of a non-contact IC card comprising:
   a substrate of a non-contact IC card, the substrate including opposed first and second surfaces;
   an electrically conducting coil layer disposed on the first surface of the substrate having at least one turn with first and second ends disposed on the first surface of the substrate, the second end being located inside the at least one turn;
   an electrically conducting adjusting pattern disposed on the first surface of the substrate outside the turn electrically connected to the electrically conducting coil layer; and
   an electrically conducting pattern disposed on the second surface of the substrate and penetrating through the substrate at the adjusting pattern and at the second end, electrically connecting the second end to the adjusting pattern.

4. An inductor for forming an antenna circuit of a non-contact IC card comprising:
   a substrate of a non-contact IC card, the substrate including opposed first and second surfaces;
   an electrically conducting coil layer disposed on the first surface of the substrate in the form of a spiral coil including at least two turns with first and second ends disposed on the first surface of the substrate, the second end being located inside the at least two turns;
   an electrically conducting adjusting pattern disposed on the first surface of the substrate outside the turns extending from and electrically connected to the electrically conducting coil layer; and
   an electrically conducting pattern disposed on the second surface of the substrate and penetrating through the substrate at the adjusting pattern and at the second end, electrically connecting the second end to the adjusting pattern.

5. An inductor for forming an antenna circuit of a non-contact IC card comprising:
   a substrate of a non-contact IC card, the substrate including opposed first and second surfaces;
   an electrically conducting coil layer disposed on the first surface of the substrate in the form of a spiral coil including at least first, second, and third turns with first and second ends disposed on the first surface of the substrate and an intermediate connection point disposed on the first surface between the first and second ends, the second end being located inside the at least first, second, and third turns;
   an electrically conducting adjusting pattern disposed on the first surface of the substrate outside the turns extending from and electrically connected to the electrically conducting coil layer; and
   first and second electrically conducting patterns disposed on the second surface of the substrate, the first electrically conducting pattern penetrating through the substrate at the adjusting pattern and at the second end, electrically connecting the second end to the adjusting pattern, and the second electrically conducting pattern penetrating through the substrate at the intermediate connection point and at the second end, electrically connecting the intermediate connection point to the adjusting pattern.

* * * * *